United States Patent [19]

Inagaki et al.

[11] Patent Number: 4,885,228
[45] Date of Patent: Dec. 5, 1989

[54] OPTICAL INFORMATION RECORDING MEDIUM

[75] Inventors: Yoshio Inagaki; Keiichi Adachi; Yoshiaki Suzuki, all of Minami-Ashigara, Japan

[73] Assignee: Fuji Photo Film Co., Ltd., Kanagawa, Japan

[21] Appl. No.: 78,844

[22] Filed: Jul. 28, 1987

[30] Foreign Application Priority Data

Jul. 29, 1986 [JP] Japan .................. 61-178504
Oct. 20, 1986 [JP] Japan .................. 61-248976

[51] Int. Cl.$^4$ .......... G11B 7/24; G01D 9/00; G03C 5/16; B41M 5/26
[52] U.S. Cl. .................. 430/270; 430/495; 430/945; 346/135.1
[58] Field of Search .......... 430/945, 495, 270; 346/135.1

[56] References Cited

U.S. PATENT DOCUMENTS

| | | |
|---|---|---|
| 4,460,665 | 12/1982 | Kunikane et al. |
| 4,626,496 | 12/1986 | Sato .................. 430/270 |
| 4,652,514 | 3/1987 | Abe et al. .................. 430/495 |
| 4,656,121 | 4/1987 | Sato et al. .................. 430/495 |
| 4,713,314 | 12/1987 | Namba et al. .................. 430/270 |
| 4,735,889 | 4/1988 | Namba et al. .................. 430/945 |
| 4,761,181 | 8/1988 | Suzuki .................. 106/22 |
| 4,763,966 | 8/1988 | Suzuki et al. .................. 350/1.1 |

FOREIGN PATENT DOCUMENTS

| | | |
|---|---|---|
| 59-24692 | 2/1984 | Japan . |
| 59-67092 | 5/1984 | Japan . |
| 59-85791 | 7/1984 | Japan . |
| 59-124045 | 8/1984 | Japan . |
| 59-202892 | 12/1984 | Japan . |

OTHER PUBLICATIONS

G. G. Dyadyusha et al., "Dyes and Pigments", 4, 179–194 (1983).

Primary Examiner—Paul R. Michl
Assistant Examiner—Mark R. Buscher
Attorney, Agent, or Firm—Birch, Stewart, Kolasch & Birch

[57] ABSTRACT

An optical information recording medium having the ability to read or write information by reading or causing changes in the absorption of lasers, comprising a substrate having provided thereon a compound represented by the following general formula, and optionally a quencher:

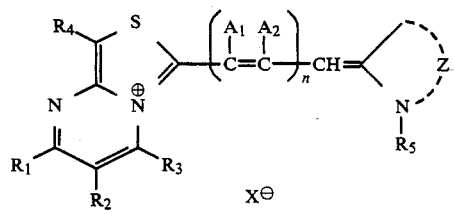

wherein $A_1$ and $A_2$ independently represent a hydrogen atom or a substituent; Z represents an atomic group necessary for forming a five-membered heterocycle; $R_1$ to $R_4$ independently represent hydrogen atom or a substituent; $R_5$ represents a substituent or may form a six-membered heterocycle with Z; n represents 0.1 or 2; and $X^\ominus$ represents an anion.

The optical information recording medium has high sensitivities in recording and regeneration, a high C/N ratio and high resistance to heat, moisture and light, and when a quencher is further contained, durability against repeated irradiation of reading light stability in preservation can be further increased.

34 Claims, No Drawings

OPTICAL INFORMATION RECORDING MEDIUM

BACKGROUND OF THE INVENTION

1. Field of the Invention

The present invention relates to an optical information recording medium (hereinafter sometimes referred to as an optical recording medium) containing a certain cyanine dye in the recording layer. More specifically, the present invention relates to an optical recording medium used in a method for directly recording information by laser beam and the like and regenerating it by change of the reflected light.

The optical recording medium of the present invention may further contain a quencher.

2. Description of Prior Art

Heretofore, optical recording media where a thin dye film is used as a recording layer have been known (for example, Japanese Published Unexamined patent application No. 16948/1981). That is to say, this kind of optical memory media is equipped with a reflecting metal film between a substrate and a thin dye film recording layer, and recording and reading of information are conducted by irradiating them from the side of the recording layer with laser beams at the absorption maximum. However, there are problems in such optical recording media including errors in recording and regeneration of information which tend to occur as a result of dust and the like which sticks to the recording layer because protection of the dye recording layer is difficult. Other problems include the fact that the composition of the medium is made complicated since a reflecting metal film is necessary for utilization in a reflection type optical recording medium; the sensitivities of recording and regeneration are not adequate; and the information recording medium itself cannot withstand long term preservation.

An optical recording medium of the heat mode type utilizes recording light as heat. An example of such a medium including the well known pit-forming type of the medium where information is recorded by melting to remove parts of the medium with recording light such as a laser which forms a pit, and the reading of a record is conducted by detecting this pit with reading light.

Various dyes or combinations of dyes and resins have been used in a recording layer of such optical recording media. However, one drawback of such optical recording media have is that the sensitivity of C/N ratio thereof is lowered by repeated erasing, erasing. Other problems include repeated irradiation of reading light or long term preservation. Therefore, in order to improve light stability of the dye and to especially prevent decolorization owing to reading light (regeneration deterioration), it has been proposed to use a dye and a quencher together (see, for example, Japanese Patent Published Unexamined Application Nos. 162691/1985, 201988/1985, 203488/1985 and 257290/1985).

However, even by combination with a quencher the durability of the optical recording medium against reading light, or stability thereof in long term preservation has not yet adequately been satisfactory from a practical point of view.

SUMMARY OF THE INVENTION

Accordingly, an object of the present invention is to provide one optical recording medium having high sensitivities of recording and reproduction, a high C/N ratio and excellent preservability (above all excellent heat-, moisture-, and light-fastness).

Another object of the present invention is to provide an optical recording medium which has durability against repeated irradiation of reading light and excellent stability in preservation.

The above objects of the present invention have been accomplished by providing on a substrate a thin film containing at least one of the compounds represented by the following general formula (I). That is to say, the present invention relates to an optical information recording medium having the ability to read or write information by reading or causing changes in the absorption of lasers, comprising a recording layer on at least one side of a substrate, the improvement where the recording layer contains at least one of the compounds represented by the following formula (I):

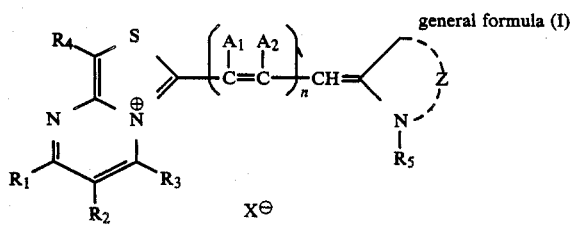

general formula (I)

wherein $A_1$ and $A_2$ independently represent a hydrogen atom or a substituent; Z represents an atomic group necessary for forming a five-membered heterocycle; $R_1$ to $R_4$ independently represent a hydrogen atom or a substituent; $R_5$ represents a substituent or may form a six-membered heterocycle with Z; n represents 0, 1 or 2; and $X^\ominus$ represents an anion.

According to another aspect of the present invention, there is provided an optical recording medium where a dye as represented by the above general formula (I) and a quencher are provided or a substrate.

DETAILED DESCRIPTION OF THE INVENTION

Preferred compounds among those represented by the general formula (I) are represented by the following general formula (II):

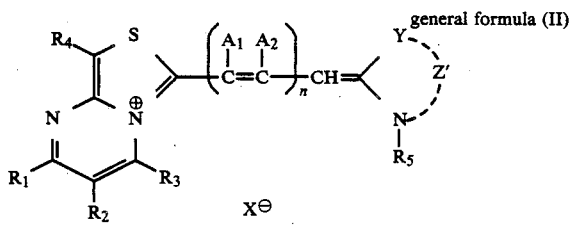

general formula (II)

wherein $A_1$ and $A_2$ independently represent a hydrogen atom, a halogen atom, a substituted or unsubstituted alkoxy group, a substituted or unsubstituted aryloxy group, cyano group, a substituted or unsubstituted alkyl group, a substituted or unsubstituted aryl group, or a substituted or unsubstituted aralkyl group; Y represents $NR_6$ (where $R_6$ represents a substituted or unsubstituted alkyl group, a substituted or unsubstituted aryl group, or a substituted or unsubstituted aralkyl group), O, S, Se or Te; Z' represents an atomic group necessary for forming a five-membered heterocycle, $R_1$, $R_2$, $R_3$ and $R_4$ independently represent a substituted or unsubstituted alkyl group, a substituted or unsubstituted aryl group, a substituted or unsubstituted aralkyl group, or a hydrogen atom; $R_5$ represents a substituted or an unsubstituted alkyl group, a substituted or unsubstituted aryl group, a substituted or unsubstituted aralkyl group, or an atomic group necessary for forming a six-membered heterocycle by combination with $Z'$; n represents 0, 1 or 2; and X represents an anion. X may form an inner salt by bonding to $R_1$, $R_2$, $R_3$, $R_4$, $R_5$, $R_6$, $Z'$, $A_1$ or $A_2$.

Compounds represented by the general formula (II) are explained below in more detail.

Preferred groups among those represented by $A_1$ and $A_2$ are a hydrogen atom, chlorine atom, a substituted or unsubstituted alkyl group having 1 to 20 carbon atoms, a substituted or unsubstituted phenyl group having 6 to 20 carbon atoms, a substituted or unsubstituted benzyl group having 7 to 20 carbon atoms, a substituted or unsubstituted alkoxy group having 1 to 20 carbon atoms, a substituted or unsubstituted phenoxy group having 6 to 20 carbon atoms, and a substituted or unsubstituted benzyloxy group having 7 to 20 carbon atoms. Preferred substituents on these groups are a halogen atom (F, Cl, Br or I), cyano group, an alkoxy group, an aryloxy group, an ester group, a carbonamido group, a sulfonamido group, a carbamoyl group, a sulfamoyl group, an ureido group, a sulfonyl group, hydroxy group, a sulfo group and a carboxyl group, and these substituents may further be substituted. Especially preferred groups among those represented by $A_1$ and $A_2$ are hydrogen atom, chlorine atom, an alkyl group having 1 to 6 carbon atoms, a phenyl group, a benzyl group, an alkoxy group having 1 to 6 carbon atoms, and a phenoxy group.

Preferred groups among those represented by Y and O, S, Se, Te and $NR_6$ having 1 to 20 carbon atoms, where $R_6$ represents a substituted or unsubstituted alkyl group, a substituted or unsubstituted phenyl group, or a substituted or unsubstituted benzyl group. Preferred substituents of these $R_6$ groups are the same as those described above as preferred substituents of the groups represented by $A_1$ and $A_2$.

Especially preferred groups among those represented by Y are O, S, Se, Te and $NR_6$ where $R_6$ is an alkyl group having 1 to 6 carbon atoms, a phenyl group or a benzyl group.

Preferred atomic groups among those represented by $Z'$ are an atomic group necessary for forming a benzo or naphthoazole ring, and $-(CH=CH)-$, and these groups may be substituted by a group stated above as preferred substituents of the groups represented by $A_1$ and $A_2$. Especially preferred atomic groups among those represented by $Z'$ are $-(CH=CH)-$, $-(CH=CH)-$ substituted with a halogen atom (F, Cl, Br or I), an alkyl group having 1 to 6 carbon atoms, a phenyl group, a substituted phenyl group having 6 to 12 carbon atoms, an alkoxy group having 1 to 6 carbon atoms, a substituted or unsubstituted phenoxy group having 6 to 20 carbon atoms, a carbonamido group having 1 to 20 carbon atoms, a sulfonamido group having 1 to 20 carbon atoms or an ureido group having 1 to 20 carbon atoms, and an atomic group capable of forming a condensed pyrimidine ring by combination with $R_5$.

Preferred groups among those represented by $R_1$, $R_2$, $R_3$ and $R_4$ are a substituted or unsubstituted alkyl group having 1 to 20 carbon atoms, a substituted or unsubstituted phenyl group having 6 to 20 carbon atoms, a substituted or unsubstituted benzyl group having 7 to 20 carbon atoms, and hydrogen atom. Substituents of these groups include those stated above as preferred substituents of the groups represented by $A_1$ and $A_2$. Especially preferred groups as the groups represented by $R_1$ and $R_3$ are a substituted or unsubstituted alkyl group having 1 to 12 carbon atoms, and a substituted or unsubstituted phenyl group having 6 to 12 carbon atoms. Especially preferred $R_2$ groups are hydrogen atom, an alkyl group having 1 to 20 carbon atoms, and a substituted or unsubstituted phenyl group having 6 to 20 carbon atoms. Especially preferred $R_4$ groups are a phenyl group and a substituted phenyl group having 6 to 20 carbon atoms.

Preferred groups among those represented by $R_5$ are a substituted or unsubstituted alkyl group having 1 to 20 carbon atoms, a substituted or unsubstituted phenyl group having 6 to 20 carbon atoms, a substituted or unsubstituted aralkyl group having 7 to 20 carbon atoms, and an atomic group necessary for forming a condensed pyrimidine ring by combination with $Z'$. Preferred substituents thereof are the same as those stated as preferred substituents of the groups represented by $A_1$ and $A_2$.

Especially preferred groups among those represented by $R_5$ are an alkyl group having 1 to 20 carbon atoms, a sulfoalkyl group having 2 to 4 carbon atoms, a phenyl group, a sulfophenyl group, a benzyl group, a sulfobenzyl group, a phenethyl group, a sulfophenethyl group and an atomic group necessary for forming a condensed pyrimidine ring by combination with $Z'$ ($-CR_3=CR_2-CR_1=N-$).

A preferred n value is determined depending on wave length of light used for recording or reading of information, and for example, it is preferable that n is 2 when light of 700 to 900 nm is used, n is 1 when light of 600 to 850 nm, especially 660 to 800 nm is used, and n is 0 when light of 500 to 650 nm, especially 540 to 560 nm is used.

Preferred anions represented by X include a halide ion, a sulfate ion, a monoalkylsulfate ion, a perchlorate ion, a sulfonate ion, a carbonate ion, a nitrate ion, an acetate ion, a benzoate ion, an oxalate ion, a phosphate ion, a tetrafluoroborate ion and a hexafluorophosphate ion.

Especially preferred anions represented by X are a bromide ion, an iodide ion, a sulfate ion, a monoalkylsulfate ion, a perchlorate ion, a hexafluorophosphate ion an alkylsulfonate ion and an arylsulfonate ion.

Specific examples of the compounds represented by the general formula (I) are listed below, but the present invention should not be limited thereto.

1.
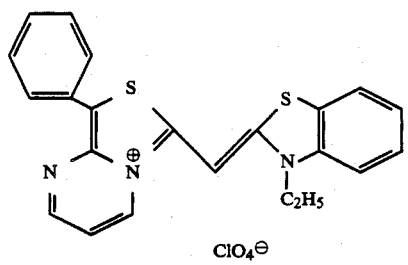
2.
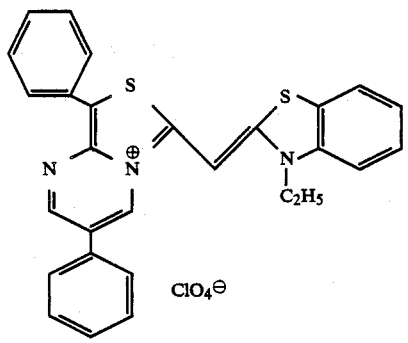
3.
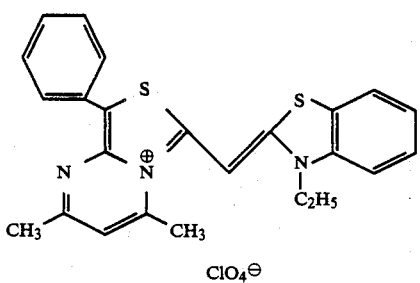
4.
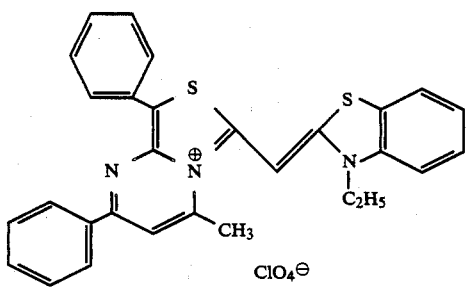
5.
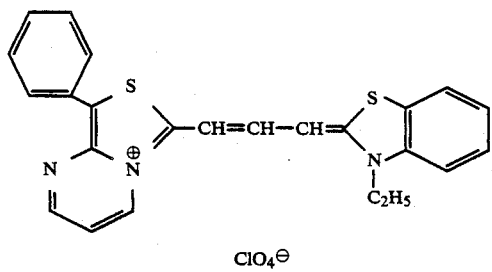

6.
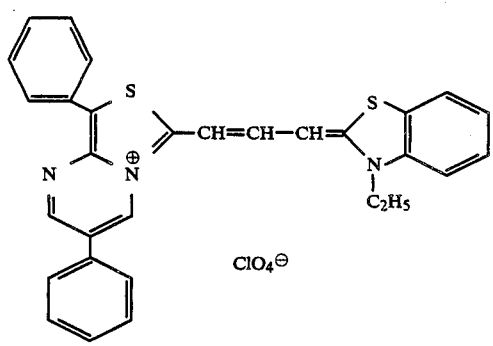
7.
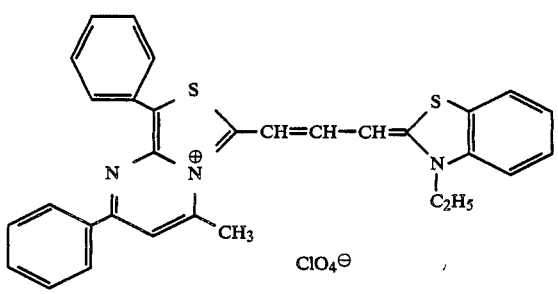
8.
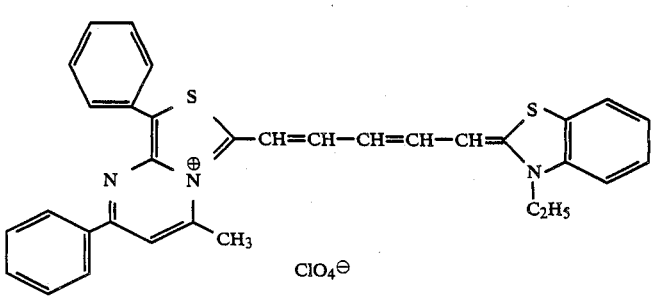
9.
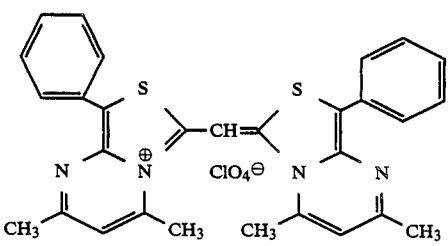
10.
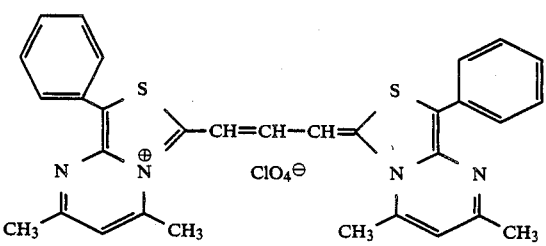

11.
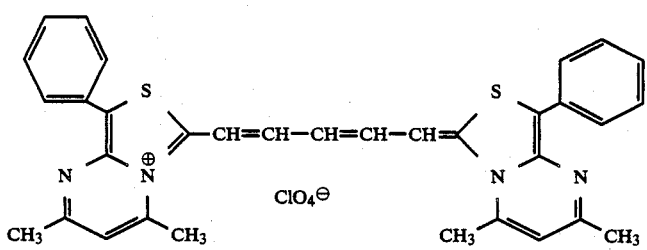
12.
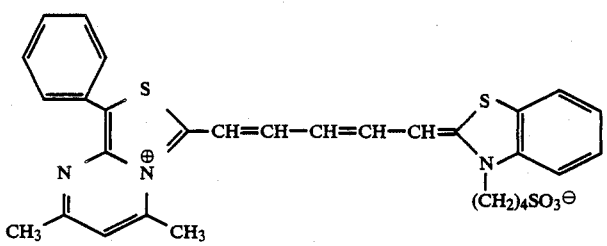
13.
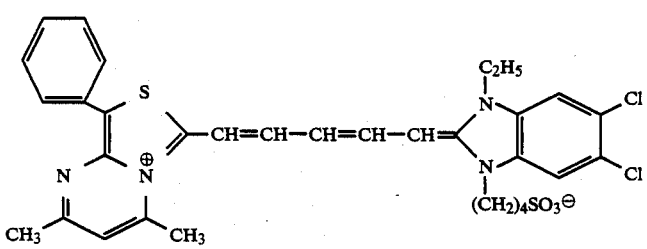
14.
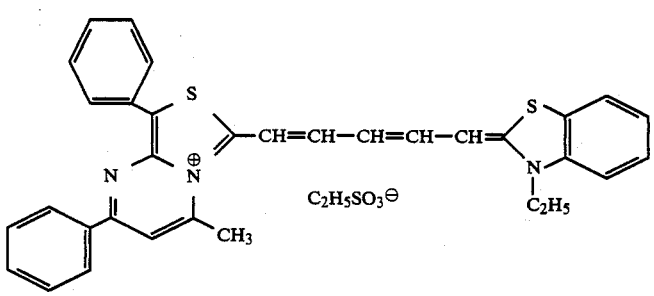
15.
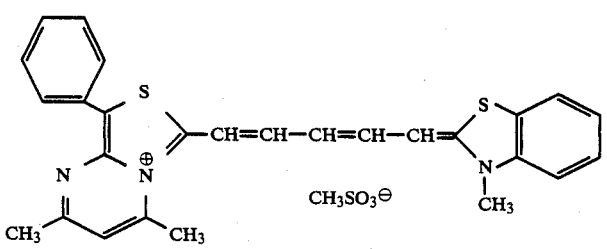
16.
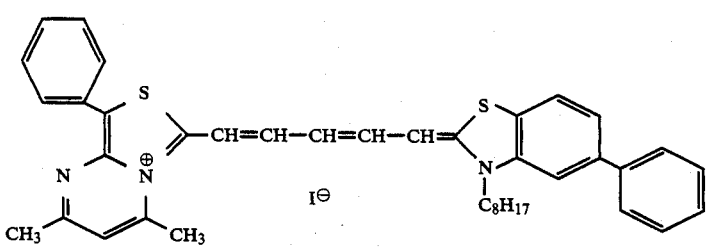

-continued
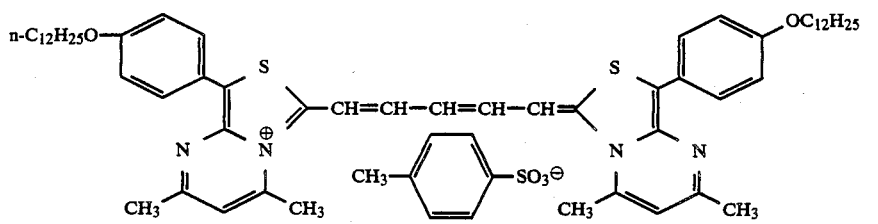
17.
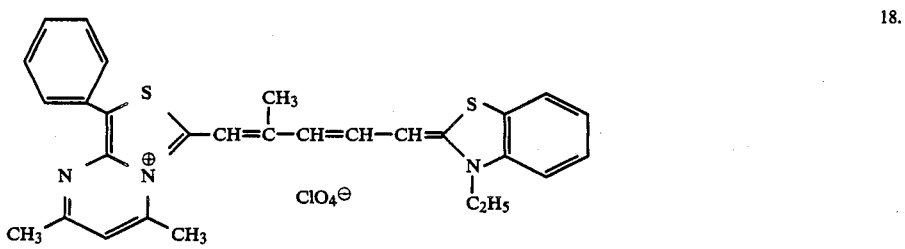
18.
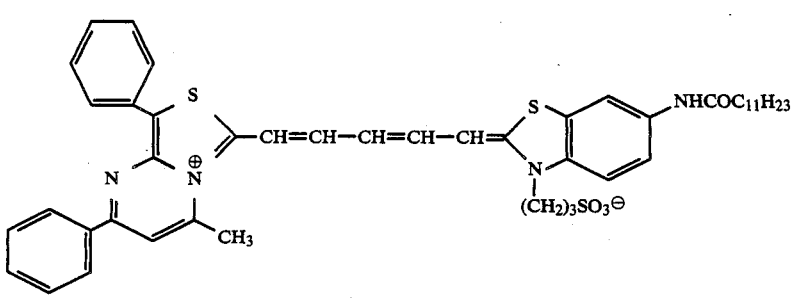
19.
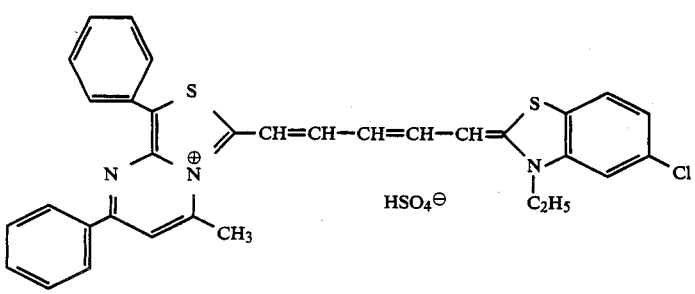
20.
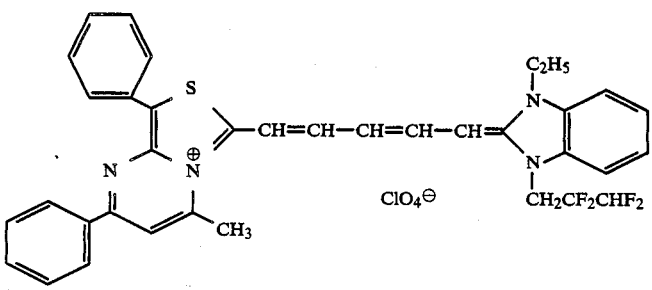
21.
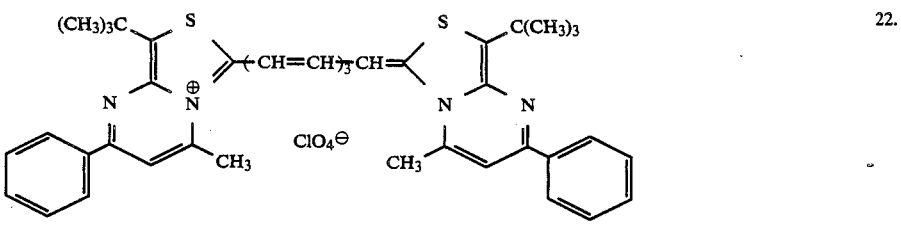
22.

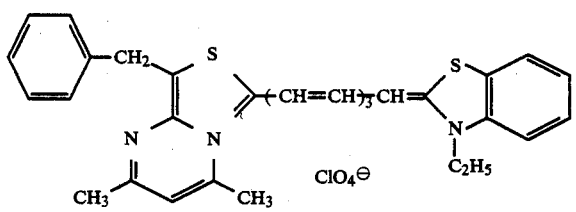

23.

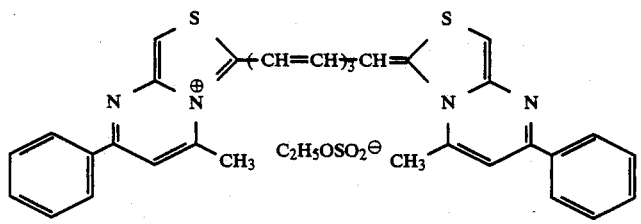

24.

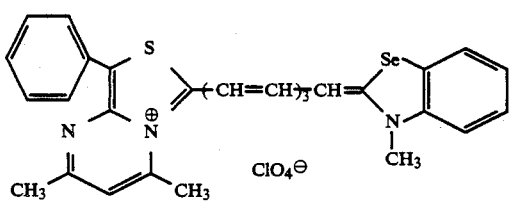

25.

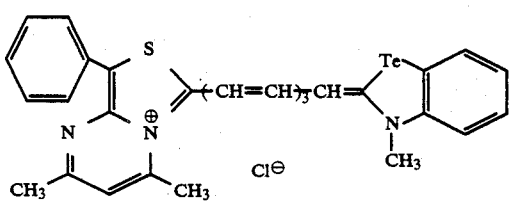

26.

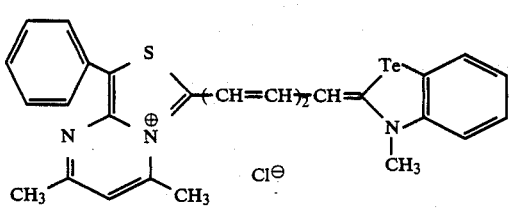

27.

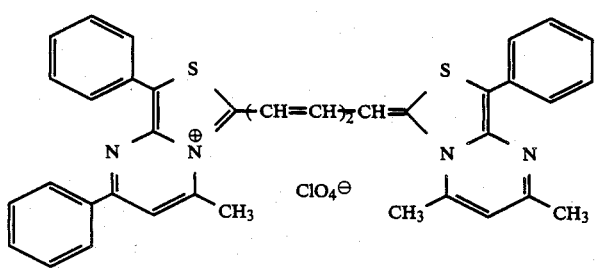

28.

Synthesis of the compounds represented by the general formula (I) is disclosed, for example in G. G. Dyadyusha et al., Dyes and Pigments, 4, 179-194 (1983), and various derivatives thereof may also be synthesized according to this method. Synthetic examples thereof and shown below.

SYNTHETIC EXAMPLE 1

Synthesis of the specific compound 8

First, 0.43 g of 3-ethyl-2-(4-acetoanilido-1,3-butadienyl) benzothiazolium perchlorate was dissolved in 5 ml of ethanol, and 0.35 g of 4,6-dimethyl-2,8-diphenylthiazolo [3,4-a]pyridinium perchlorate dissolved in 3 ml of acetonitrile were added thereto. While the resulting solution was refluxed with heating, 0.1 g of triethylamine was added thereto. The formed precipitate of the dye was collected by filtration and recrystallized from acetonitrile. Yield 0.21 g, M.P. 200°-201° C., Absorption spectrum of acetonitrile solution: $\lambda max=790$ nm, log $\epsilon max=4.91$

SYNTHETIC EXAMPLE 2

Synthesis of the specific compound 10

The mixture of 0.35 g of 2,4,6-trimethyl-8-phenyl-thiazolo (3,4-a)pyrimidinium perchlorate, 0.25 g of diphenylformamidine and 3 ml of acetic anhydride was heated at 110° C. for one hour. Ether was added thereto to precipitate the product, and the product was washed with ether and collected by filtration. To this precipitate was added 0.35 g of 2,4,6-trimethyl-8-phenyl-thiazolo[3,4-a]pyridinium perchlorate and 2 ml of acetic anhydride, the mixture was heated under reflux 0.1 g of triethylamine was added thereto, and then the formed precipitate of the dye was recovered by filtration. Yield 0.11 g, M.P. 243°-244° C., Absorption spectrum in acetonitrile; $\lambda max=805$ nm, log $\epsilon max=4.76$.

SYNTHETIC EXAMPLE 3

Synthesis of the specific compound 11

The mixture of 0.75 g of 2,4,6-trimethyl-8-phenyl-thiazolo (3,4-a)pyrimidinium perchlorate, 0.26 g of (3-anilino-2-propenylidene)phenylammonium chloride and 5 ml of acetic anhydride was heated under reflux, and 0.1 g of triethylamine was added thereto. The formed dye was collected by filtration.

Yield 0.14 g, M. P. 296°-297° C., Absorption spectrum in acetonitrile: max=895 nm, log max=4.92.

It has been found that the dyes represented by the general formula (I) are especially excellent in heat-, moisture-, and light-fastness compared with usual cyanine dyes which respectively have the absorption maximum wave length of the same extent. The reason is not certain that the stability of the dyes represented by the general formula (I) has been enhanced. However, taking it into consideration that stability generally becomes lower as the machine chain length of a cyanine dye becomes longer, it is presumed that the reason is due to the fact that the absorption maximum wave lengths of the same extent as that of usual cyanine dyes can be obtained by the methine chain lengths shorter than those of the usual cyanine dyes.

Various singlet oxygen quenchers can be used in an optical recording medium of the present invention. As such quenchers, transition metal complexes which lower deterioration during reproduction and have good compatibility with dyes are preferable. Preferred metals as the center metal are Ni, Co, Cu, Pd, Pt and the like.

Examples of novel quenchers include those represented by the following general formula (III) or (IV):

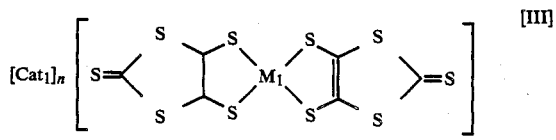

[III]

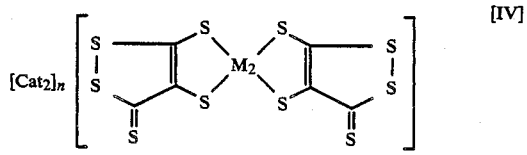

[IV]

wherein, (Cat$_1$) and (Cat$_2$) represent cations necessary for making each complex neutral, M$_1$ and M$_2$ represent nickel, copper, cobalt, palladium or platinum, and n represents 1 or 2.

In the compounds represented by the above general formula (III) or (IV), inorganic cations among cations represented by (Cat$_1$) or (Cat$_2$) include an alkali metal ion such as Li$^+$, Na$^+$ and K$^+$, an alkaline earth metal ion such as Mg$^{2+}$, Ca$^{2+}$ and Ba$^{2+}$, and NH$_4$$^+$. Further, organic cations among those cations include a quaternary ammonium ion and a quarternary phosphonium ion.

Preferred cations among the above cations (Cat$_1$) and (Cat$_2$) are those represented by the following general formula (V-a), (V-b), (V-c), (V-d) or (V-e):

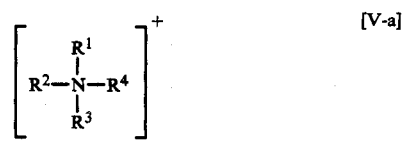

[V-a]

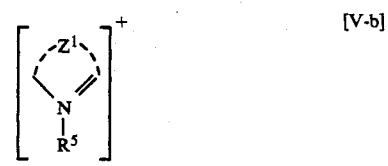

[V-b]

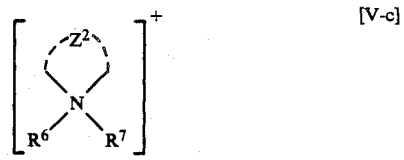

[V-c]

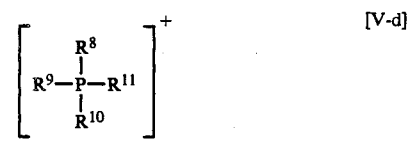

[V-d]

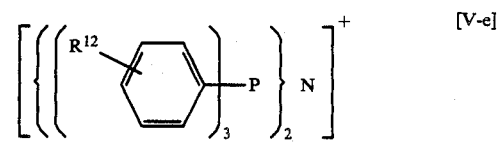

[V-e]

wherein, R$^1$, R$^2$, R$^3$, R$^4$, R$^5$, R$^6$, R$^7$, R$^8$, R$^9$, R$^{10}$, R$^{11}$ and R$^{12}$ respectively represent a substituted or unsubstituted alkyl group having 1 to 20 carbon atoms, or a substituted or unsubstituted aryl group having 6 to 14 carbon atoms, and Z$^1$ and Z$^2$ represent a nonmetal atomic group which form five-membered or six-membered ring together with a nitrogen atom or a phosphorus atom in each formula.

The above substituted or unsubstituted alkyl group having 1 to 20 carbon atoms includes, for example a methyl group, an ethyl group, a n-butyl group, an iso-amyl group, a n-dodecyl group and n-octadecyl group. The aryl group having 6 to 14 carbon atoms include, for example a phenyl group, a tolyl group and an α-naphthyl group.

These alkyl groups and aryl groups may respectively be substituted with a cyano group, a hydroxyl group, an alkyl group having 1 to 20 carbon atoms (e.g., a methyl group, an ethyl group, a n-butyl group and a n-octyl group), an aryl group having 6 to 14 carbon atoms (e.g., a phenyl group, a tolyl group and an α-naphthyl group), an acyloxy group having 2 to 20 carbon atoms (e.g., a acetoxy group, a benzoyl group and p-methoxybenzoyloxy group), an alkoxy group having 1 to 6 carbon atoms (e.g., a methoxy group, an ethoxy group, a propoxy group and a butoxy group), an aryloxy group (e.g., a phenoxy group and a tolyloxy group), an aralkyl group (e.g., a benzyl group, a phenethyl group and an amisil group), an alkoxycarbonyl group (e.g., a methoxycarbonyl group, an ethoxycarbonyl group and a n-butoxycarbonyl group), an aryloxycarbonyl group (e.g., a phenoxycarbonyl group and a tolyloxycarbonyl group), an acyl group (e.g., an acetyl group and a benzoyl group), an acylamino group (e.g., an acetylamino group and a benzoylamino group), a carbamoyl group (e.g., an N-ethylcarbamoyl group and an N-phenylcarbamoyl group), an alkylsulfonylamino group (e.g., a methylsulfomylamino group and a phenylsulfonylamino group), a sulfamoyl group (e.g., an N-ethylsulfamoyl group and an N-phenylsulfamoyl group), a sulfonyl group (e.g., a mesyl group and a tosyl group) and the like.

$Z^1$ and $Z^2$ represent respectively a nonmetal atomic group necessary for forming a five-membered ring or a six-membered ring as aforesaid. The five-membered ring or a six-membered ring may include a pyridine ring, an imidazole ring, a pyrrole ring, a 2-pyrroline ring, a pyrrolidine ring, a piperidine ring, a pyrazole ring, a pyrazoline ring, a imidazoline ring and the like.

Cations represented by the general formula (V-b) may include, for example a dodecylpyridinium group, a hexadecylpyridinium group and a dodecylimidazolium group. Cations represented by the general formula (V-c) may include, for example an N-ethyl-N-hexadecylpiperidinium group, an N-ethyl-N-dodecylpyrazolidinium group.

Cations preferably used in the present invention among cations represented by the above general formulae (V-a), (V-b), (V-c), (V-d) and (V-e) are (V-a), (V-b), (V-d) and (V-e) in view of availability of the raw materials and preparation cost.

The type of these cations ($Cat_1$) and ($Cat_2$) has an influence on the solubilities of the compounds represented by the aforesaid general formula (III) or (IV) in organic solvents.

In general, when substituents bonding to the quaternary hetero atom are alkyl groups, solubility of the compound increases as the chain lengths of the alkyl groups become longer. This tendency is remarkable in case of tetraalkyl substituted ammonium or tetraalkyl substituted phosphonium, and cations having a total carbon number of 17 or more in case of ammonium cations and cations having a total carbon number of 4 or more in case of phosphonium cations respectively bestow high solubilities on the compounds.

$M_1$ and $M_2$ in the compounds represented by the aforesaid general formula (III) or (IV) may be put in the order of nickel, cobalt, copper, palladium and platinum in a descending scale.

The metal complexes of the general formula (III) or (IV) have stereostructures of plane four coordination. Though it cannot be definitely determined whether the thioketone groups in the compounds of the general formula (IV) exist symmetrically or unsymmetrically in relation to the center metal, the thioketone groups are represented for convenience's sake as in the general formula (IV) in the present specification.

The compounds represented by the aforesaid general formula (III) or (IV) may be synthesized as follows.

A compound of the general formula (III) (n=2): Disodium 1,3-dithiol-2-thione-4,5-dithiolate obtained by reacting carbon disulfide with sodium is converted to a zinc complex, and benzoyl chloride is reacted with the complex to form a bisbenzoylthio compound. After decomposition with an alkali, the bisbenzoylthio compound is reacted with a metal salt to obtain the captioned compound.

Further, a compound of the general formula (III) (n=1) may be obtained by oxidizing a complex obtained as above-described (n=2) with a proper oxidizing agent.

A compound of the general formula (IV) (n=2): First, disodium 1,3-dithiol-2-thione-4,5-dithiolate obtained by reaction of carbon disulfide with sodium is heated to above 130° C. to isomerize it to disodium 1,2-dithiol-3-thione-4,5-dithiolate. Then, this dithiolate is converted to a zinc complex, and benzoyl chloride is reacted with the zinc complex to form a bisbenzoylthio compound, which is the decomposed with an alkali and reacted with a metal salt to obtain the captioned compound.

A compound of the general formula (IV) (n=1) may be obtained by oxidizing the complex obtained as above-described (n=2) with a proper oxidizing agent.

Further, the 1,3-dithiol-2-thione-4,5-dithiolate anion which is an intermediate for obtaining a compound of the general formula (III) or (IV) may also be obtained by electrochemical reduction besides the Na-reduction method described above.

Preferred compounds among those represented by the aforesaid general formula (III) are illustrated as follows.

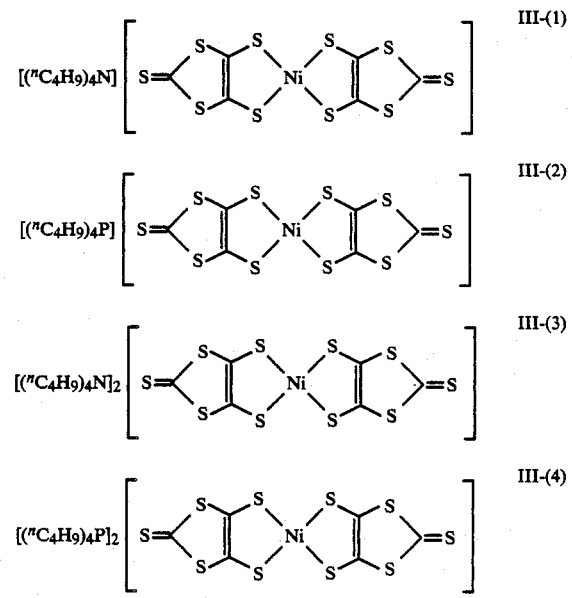

Synthetic examples of compounds represented by the general formula (III) are demonstrated below.

SYNTHETIC EXAMPLE 4

(Synthesis of the exemplified compound (III-4)) (1-1) Synthesis of bis(tetraethylammonium)bis(1,3-dithiol-2-thione-4,5-dithiolate) zinc complex All reaction procedures were conducted in an argon atmosphere. 23 g of sodium was cut into small pieces and dispersed in 180 ml of carbon disulfide, followed by dropwise addition in a slow speed of 200 ml of dimethylformamide thereto with stirring. During the dropwise addition, caution should be given so that the mixture does not rapidly generate heat. After the dropwise addition of dimethylformamide, the mixture was gently heated to be refluxed for 24 hours with caution. After completion of the reaction the unreacted sodium was removed by filtration. Then, 50 ml of ethanol was added to the filtrate, and the mixture was stirred at room temperature for 2 hours. Carbon disulfide was distilled away from this solution at room temperature under reduced pressure. Then, 300 ml of water was slowly added dropwise thereto and the resulting solution was filtered.

Separately in advance, 20 g of zinc chloride was dissolved in 500 ml of methanol and 500 ml of concentrated ammonia water was added thereto to prepare a solution. This solution was added to the above filtrate at room temperature. After stirring for 5 minutes, an aqueous solution of 53 g of tetraethylammonium bromide in 250 ml of water was added to the mixture to immediately form a red precipitate, which was recovered by filtration and air-dried to obtain the captioned zinc complex.

(1-2) Synthesis of 4,5-bis(benzoylthio)-1,3-dithiol-2-thione 22 g of the zinc complex obtained in (1-1) was dissolved in 500 ml of acetone and filtered. 150 ml of benzoyl chloride was added to the filtrate with stirring to form immediately a yellow precipitate. The precipitate was recovered by filtration, washed with water and air-dried to obtain 16 g of the captioned compound.

(1-3) Synthesis of the exemplified compound (III-4)

9.2 g of the bis(benzoylthio) compound obtained in (1-2) was dissolved in 50 ml of methanol. Then, 6.3 g of a 28% methanol solution of sodium methoxide was added thereto, followed by stirring for 10 minutes. To this solution was added the solution of 2.4 g of nickel chloride hexahydrate in 50 ml of methanol, and the mixture was stirred at room temperature for 30 minutes. To the resulting solution was added the solution of 8.5 g of tetrabutylphosphonium bormide in 100 ml of methanol to form immediately a black precipitate. The mixture was stirred for additional 20 minutes and filtered. The solid was washed with acetone, air-dried and recrylstallized from acetone-isopropyl alcohol to obtain the captioned compound. Yield 3.8 g.

SYNTHETIC EXAMPLE 5

(Synthesis of the exemplified compound (III-2))

1 g of the nickel complex obtained in (1-3) was dissolved in 60 ml of acetone, and 30 ml of acetic acid was added thereto. The mixture was stirred for 3 hours and the solvent was distilled off to form black crystals, which was then recrystallized from acetone-methanol to obtain the desired exemplified compound (III-2). Yield 0.4 g, M.P. 185° C., λmax: 1125 nm, εmax: $2.51 \times 10^4$ (in $CH_2Cl_2$)

Further, as known quenchers, there are those disclosed in Japanese Patent Publication Unexamined Application No. 178295/1984. That is, the following compounds are enumerated:

(i) Bisdithio-α-diketone series

wherein $R^1$ to $R^4$ represent an alkyl group or an aryl group, and M represents a divalent transition metal atom:

(ii) Bisphenyldithiol series

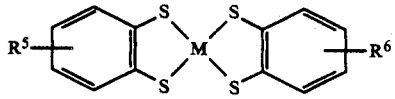

wherein $R^5$ and $R^6$ represent an alkyl group or a halogen atom, and M represents a divalent transition metal atom;

(iii) Acetylacetonate chelate series;
(iv) Dithiocarbamic acid chelate series;
(v) Bisphenylthiol series;
(vi) Thiocatechol chelate series;
(vii) Salicylaldehyde oxime series;
(viii) Thiobisphenolate chelate series;
(ix) Phsophonous acid chelate series;
(x) Benzoate series; and
(xi) Hindered amine series.

In addition to the above compounds, aminium series or diimonium series compounds represented by the following formula are mentioned, and specific examples thereof include IRG-002, IRG-003, IRG-022 and IRG-033 manufactured and sold by Nippon Kayaku Co., Ltd.

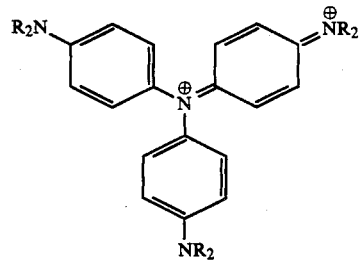

wherein R represents an alkyl group or an aryl group.

It is possible in the present invention to use a combination of a cation of an aforesaid dye with an anion of an aforesaid quencher.

The quencher is generally used in an amount of 0.5 to 12 moles, preferably 0.1 to 1.2 moles per 1 mole of the aforesaid dye.

It is preferable to incorporate the quencher in the dye film recording layer, but it is also possible to incorporate it in a layer other than the recording layer.

It is possible in an optical recording medium of the present invention to provide a subbing layer on the substrate, a protective layer on the recording layer, and/or a reflecting layer on the recording layer, as occasion demands.

Known substrates may optionally be used as a substrate. Typical examples thereof are glass and plastics such as acryls, polycarbonates, polysulfones, polyimides, polyesters amorphous polyolefins, and the like.

The substrate may be used in various shapes such ad disc-like, card-like, sheet-like and roll film-like shapes.

A groove may be formed on the glass or plastic substrate in order to make tracking during recording easier. Further, a subbing layer of a plastic binder, or an inorganic oxide, an inorganic sulfide or the like may be provided on the glass or plastic substrate. A subbing layer having a thermal conductivity lower than the substrate is preferable. Further, it is also possible to make two recording media facing each other so that both recording layers are inside, namely to make two recording media so-called air sandwich structure.

The recording layer in the present invention may be formed by dissolving a dye represented by the general formula (I) and a quencher, if it is used, in an organic solvent (for example, methanol, ethanol, isopropyl alcohol, dichloromethane, dichloroethane and acetone), and, if necessary, a proper binder (for example, PVA, PVP, polyvinyl butyral, polycarbonate, nitrocellulose, polyvinyl formal, methyl vinyl ether, chlorinated paraffin, maleic anhydride copolymer, styrene-butadiene copolymer and xylene series resin) to form a solution, and coating the resulting solution (for example by spin coating) on a substrate. The recording layer may also be formed by vacuum-depositing a dye represented by the general formula (I) or co-depositing the dye and a quencher on a substrate, or by vacuum-depositing the dye and then coating a quencher. When a binder is used, it is preferable to use it in an amount of 0.01 to 2 times the weight of the dye. Further, it is also possible to form a thin film according to Langmuir-Blodgett's technique using a dye of the general formula (I).

It is possible to provide one or more of the recording layers in the present invention.

An antioxidant or a discoloration inhibitor may be contained in the recording layer or a layer adjacent thereto in order to inhibit deterioration of the dye.

Film thickness of the recording layer is usually in the range of 0.01 to 2 μm, preferably in the range of 0.02 to 0.8 μm. In case of reflection reading, it is especially preferable that the thickness is an odd number times the ¼ of the laser wave length used for reading.

When a layer for reflecting semiconductor laser, He-Ne laser or the like is provided, the optical recording medium of the present invention may be made either by providing a reflecting layer on a substrate and then providing a recording layer on the reflecting layer in such a manner as aforementioned, or by providing a recording layer on a substrate and then providing a reflecting layer thereon.

The reflecting layer may be provided in such a manner as described below in addition to a sputtering method, an ion plating method or the like.

For example, a solution which is prepared by dissolving a metal salt or a metal complex salt in a water soluble resin (PVP, PVA or the like) and further adding a reducing agent thereto is coated on a substrate and the resulting substrate is dried with heating at 50 to 150° C., preferably 60° to 100° C., whereby a reflecting layer is provided thereon.

The metal salt or the metal complex salt is used in a weight ratio of 0.1 to 10, preferably 0.5 to 1.5 based on the resin. Further, as for the thickness of the recording layer, it is proper that the thickness of the metal particle reflecting layer is in the range of 0.01 to 0.1 μm and that of the light absorption layer is in the range of 0.01 to 1 μm.

Usable metal salts and metal complex salts include silver nitrate, potassium silver cyanide, potassium gold cyanide, silver ammine complex, silver cyan complex, gold salt or gold cyan complex and the like. Usable reducing agents include formalin, tartaric acid, a tartrate, a reducing agent, a hypophosphite, sodium borohydride, dimethylamine borane and the like. The reducing agent may be used in the range of 0.2 to 10 moles, preferably 0.5 to 4 moles per 1 mole of the metal salt or the metal complex salt.

In the optical recording medium of the present invention, recording of information is conducted by irradiating a spot-like high energy beam such as laser (for example, semiconductor laser and He-Ne laser) on the recording layer through the substrate or from the opposite side of the substrate. That is to say, light absorbed in the recording layer is converted to heat and pits are formed in the recording layer.

On the other hand, reading of information is conducted by irradiating a laser beam with a low power than the threshold value for recording, and detecting the difference in quantity of reflected light or quantity of transmitted light between pitted areas and unpitted areas.

The present invention is further explained in detail below according to examples, but the scope of the present invention should not be limited thereto.

EXAMPLE 1

Solutions of the compounds which are represented by the general formula (I) and shown in Table 1 in dichlorethane were spin-coated on a surface hardened acrylic plate, followed by drying to form recording layers of film thickness of 0.4 μm, respectively.

Then signals of 0.4 MH$_z$ were recorded on the thus obtained recording media under the condition of 6 mW on the irradiated surface and the beam diameter of 1.6 μm using semiconductor laser of wave length of 830 nm, whereby pits of diameter of 1.0 μm were respectively formed with irradiation for 0.3 μ second (1.8 nJ/pit). Weak laser beams were respectively applied to these recording areas to read signals, whereby C/N ratios as shown in Table 1 were obtained.

These recording media were respectively preserved for 10 days under the condition of 60° C. and 90% RH and then velocities of discoloration were calculated based on the change of transmittance by the light of 830 nm. That is to say, half-value periods were calculated by measuring change of transmittance with time lapse and relative velocities were calculated as the inverse numbers thereof, respectively (calculated as the value of the comparative compound A being 1). Further, recordings and readings were conducted under the aforementioned condition using the recording media after preservation and C/N ratios were calculated, and changes of the C/N ratios between before and after the preservation were calculated, respectively. Analogous compounds which have hitherto been demonstrated to be excellent in stability in use as optical recording media (disclosed in Japanese Patent Unexamined Published Application No. 202892/1984) were used as comparative compounds. Further, the recording media were respectively allowed to stand under a tungsten lamp, and then light-discoloration velocities were measured.

TABLE 1

| Sample | Dye used | Discoloration velocity (Relative value) | Light-discoloration velocity (Relative value) | C/N ratio before preservation (dB) | Change of C/N ratio between before and after preservation (dB) | Note |
|---|---|---|---|---|---|---|
| 1 | Comparative compound A | 1 | 1 | 50 | −9 | Comparative example |
| 2 | Comparative compound B | 0.7 | 0.9 | 53 | −6 | Comparative example |
| 3 | Specific example 8 | 0.4 | 0.8 | 55 | −3 | Present invention |
| 4 | Specific example 10 | 0.1 | 0.4 | 56 | −2 | Present invention |
| 5 | Specific example 11 | 0.5 | 0.7 | 54 | −3 | Present invention |
| 6 | Specific example 12 | 0.4 | 0.7 | 57 | −3 | Present invention |
| 7 | Specific example 13 | 0.5 | 0.8 | 56 | −3 | Present invention |
| 8 | Specific example 14 | 0.5 | 0.7 | 56 | −4 | Present invention |
| 9 | Specific example 15 | 0.4 | 0.8 | 57 | −3 | Present invention |
| 10 | Specific example 16 | 0.4 | 0.7 | 55 | −3 | Present invention |
| 11 | Specific example 17 | 0.5 | 0.7 | 56 | −3 | Present invention |
| 12 | Specific example 18 | 0.4 | 0.7 | 55 | −4 | Present invention |
| 13 | Specific example 19 | 0.4 | 0.8 | 56 | −3 | Present invention |
| 14 | Specific example 20 | 0.5 | 0.7 | 56 | −3 | Present invention |
| 15 | Specific example 21 | 0.4 | 0.8 | 55 | −3 | Present invention |

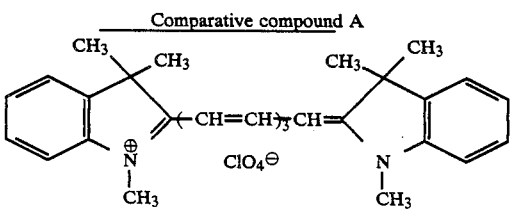

Comparative compound A

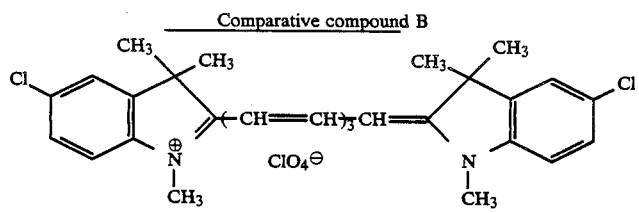

Comparative compound B

It is apparent from the results in Table 1 that the optical recording media of the present invention have high sensitivities and remarkably high stability, namely excellent heat resistance, moisture resistance and light resistance compared with the optical recording media of the comparative examples.

EXAMPLE 2

A solution of each compound which is represented by the general formula (I) and shown in Table 2 in dichloroethane was spin-coated on a surface hardened acrylic plate, followed by drying to form a recording layer of the film thickness of 0.4 μm. Then, signal of 4 MHz was recorded on the thus obtained recording medium using He-Ne laser under the condition of the beam diameter of 1.6 μm, whereby a pit of 1.0 μm was formed with irradiation of 0.4 μ seconds (1.6 nJ/pit). Weak laser beam was applied on this recording area to regenerate signal, whereby C/N ratio shown in Table 2 was obtained.

This recording medium was preserved for 10 days under the condition of 60° C. and 90% RH, and then discoloration velocity was calculated based on change of transmittance. Further, recording and regeneration was conducted under the above condition using the recording medium after preservation, C/N ratio was calculated and thereby the change of the C/N ratio before and after preservation was obtained.

A cyanine dye analogous to the compounds of the present invention was used as a comparative compound.

Further, each recording medium was allowed to stand under a tungsten lamp, and then the discoloration velocity was calculated based on the change of transmittance with the lapse of time.

ratio before preservation, which was used as a measure of stability in preservation.

A.

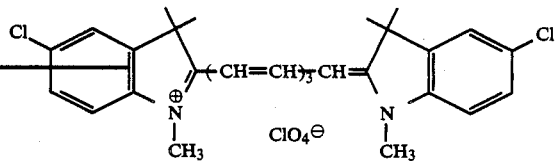

TABLE 2

| Sample | Dye used | Discoloration velocity (Relative value) | Light-discoloration velocity (Relative value) | C/N ratio before preservation (dB) | Change of C/N ratio between before and after preservation (dB) | Note |
|---|---|---|---|---|---|---|
| 16 | Comparative compound C | 1 | 1 | 18 | −8 | Comparative example |
| 17 | Specific example 1 | 0.5 | 0.4 | 34 | −3 | Present invention |
| 18 | Specific example 2 | 0.3 | 0.3 | 29 | −2 | Present invention |
| 19 | Specific example 3 | 0.4 | 0.3 | 32 | −4 | Present invention |
| 20 | Specific example 4 | 0.4 | 0.4 | 31 | −2 | Present invention |
| 21 | Specific example 9 | 0.3 | 0.2 | 35 | −4 | Present invention |

Comparative compound C

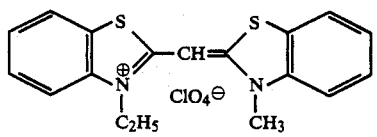

EXAMPLE 3

Each dye (I), each quencher (II) and each binder as shown in Table 3 were dissolved in a mixed solvent of methanol-methyl ethyl ketone-dichloroethane in an appropriate ratio. The solution was coated on a surface hardened acrylic plate so as to make a layer of 0.1 μm in thickness, followed by drying. The weight ratio of the dye to the quencher was 3:1, and when the binder was used, the binder was used in the amount of 1/5 times the weight of the dye.

Then, signal of 0.4 MHz was recorded on the thus obtained optical recording medium under the condition of 6 mW on the irradiated surface and the beam diameter of 1.6 μm using semiconductor laser having the wave length of 830 nm (780 nm when the dye 25 was used), whereby pits having the diameter of 1.0 μm were formed with irradiation for 0.3 μ second. A weak laser beam was applied to the recording areas, signal was regenerated, and C/N ratio was calculated. Then, a laser beam of 1 mW (830 nm, but 780 nm when the dye 25 was used) was irradiated for 10 minutes as the pulse of 1 μ second and the width of 3 kHz, C/N ratio was calculated, and then the decrease in C/N ratio was compared with the C/N ratio before the irradiation of the laser beam was calculated and was used as a measure of regeneration deterioration. Further, C/N ratio after allowing the recording medium to stand for 30 days at 60° C. under 90% RH was compared with C/N Quencher a. [($^n$C$_4$H$_9$)$_4$N] 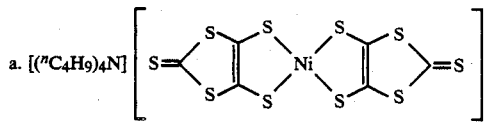

b. [($^n$C$_4$H$_9$)$_4$P] 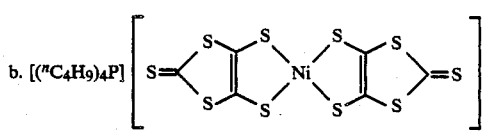

c. [(n-C$_4$H$_9$)$_4$N]$_2$ 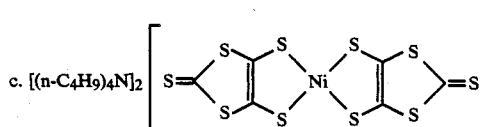

d. [(n-C$_4$H$_9$)$_4$N] 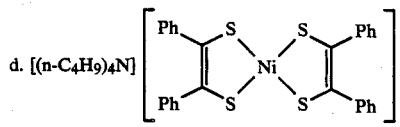

e. [(n-C$_4$H$_9$)$_4$N] 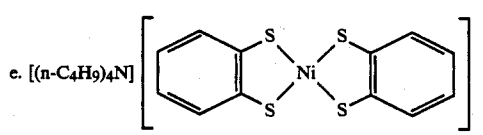

TABLE 3

Combined Use of a Novel Dye and a Quencher (Thiazolopyrimidine series)

| Sample No. | Dye | Quencher | Binder | C/N ratio (dB) | Deterioration, during reproduction (%) | Deterioration during preservation (%) |
|---|---|---|---|---|---|---|
| 22* | A | — | — | 53 | −48 | −20 |
| 23* | A | — | Nitrocellulose | 50 | −47 | −19 |
| 24* | A | a | — | 52 | −35 | −15 |
| 25* | A | a | Nitrocellulose | 50 | −20 | −9 |
| 26* | A | b | — | 52 | −21 | −9 |
| 27* | A | c | — | 53 | −19 | −9 |
| 28* | A | d | — | 51 | −35 | −17 |
| 29* | A | e | — | 52 | −28 | −17 |
| 30* | A | f | — | 52 | −30 | −16 |
| 31* | 11 | — | — | 54 | −20 | −10 |
| 32 | " | a | — | 54 | −7 | −7 |
| 33 | " | a | Nitrocellulose | 52 | −7 | −6 |
| 34 | " | b | — | 53 | −8 | −7 |
| 35 | " | b | Polyvinyl formal | 51 | −7 | −7 |
| 36 | " | c | — | 53 | −8 | −6 |
| 37 | " | c | Chlorinated paraffin | 51 | −7 | −6 |
| 38 | " | d | — | 54 | −16 | −9 |
| 39 | " | d | Nitrocellulose | 52 | −15 | −9 |
| 40 | " | e | — | 53 | −15 | −8 |
| 41 | " | e | Nitrocellulose | 51 | −14 | −8 |
| 42 | " | f | — | 53 | −15 | −9 |
| 43 | " | f | Polystyrene | 52 | −14 | −8 |
| 44 | 28 | a | — | 53 | −8 | −7 |
| 45 | " | b | — | 52 | −7 | −6 |
| 46 | 28 | c | Nitrocellulose | 52 | −7 | −6 |
| 47 | " | d | — | 51 | −16 | −10 |
| 48 | " | e | — | 52 | −15 | −9 |
| 49 | " | f | Nitrocellulose | 51 | −15 | −8 |
| 50 | 10 | a | — | 52 | −8 | −7 |
| 51 | " | b | Polyvinyl butyral | 51 | −7 | −6 |
| 52 | " | c | — | 52 | −7 | −7 |
| 53 | " | d | — | 52 | −15 | −8 |
| 54* | A | g | — | 51 | −35 | −18 |
| 55 | 11 | g | — | 53 | −16 | −10 |
| 56 | 28 | g | — | 51 | −15 | −9 |
| 57 | 10 | g | — | 52 | −17 | −9 |
| 58* | A | g | Nitrocellulose | 50 | −33 | −17 |
| 59 | 11 | g | " | 52 | −15 | −9 |
| 60 | 28 | g | " | 50 | −15 | −9 |
| 61 | 10 | g | " | 51 | −16 | −9 |
| 62 | 8 | g | — | 52 | −15 | −10 |
| 63 | 8 | a | — | 53 | −7 | −6 |

*exhibits a comparative example

It is seen from the results of Table 3 that the optical recording media of the present invention are low in generation deterioration, that is, are excellent in reading durability, and are excellent in stability in preservation, compared with the optical reading media of the comparative examples.

What we claim is:

1. An optical information recording medium being adapted to have information recorded thereon or read by a laser beam, comprising a recording layer on at least one side of a substrate, the recording layer containing at least one of the compounds represented by the following general formula (I):

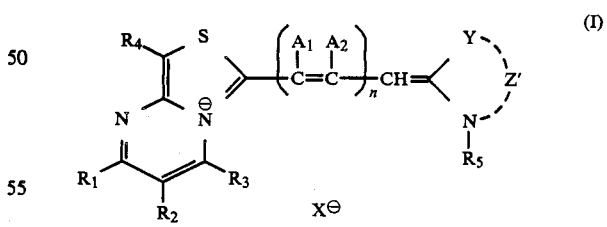

wherein:
$A_1$ and $A_2$ independently represent a hydrogen atom or a substituent;
Z represents an atomic group necessary for forming a five-membered heterocycle;
$R_1$ to $R_4$ independently represent a hydrogen atom or a substituent;
$R_5$ represents a substituent or may form a six-membered heterocycle together with Z;
n represents 0, 1 or 2; and
$X^\ominus$ represents an anion.

2. The optical information recording medium of claim 1, wherein the compounds represented by the general formula (I) are the compounds represented by the following general formula (II):

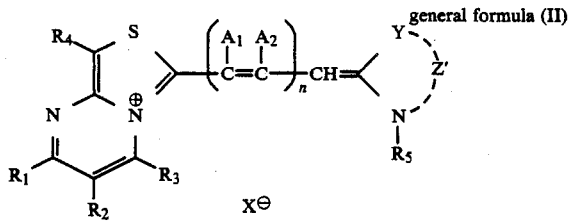

wherein $A_1$ and $A_2$ independently represent hydrogen atom, a halogen atom, a substituted or unsubstituted alkoxy group, a substituted or unsubstituted aryloxy group, cyano group, a substituted or unsubstituted alkyl group, a substituted or unsubstituted aryl group, or a substituted or unsubstituted aralkyl group; Y represents $NR_6$, where $R_6$ represents a substituted or unsubstituted alkyl group, a substituted or unsubstituted aryl group, or a substituted or unsubstituted aralkyl group, O, S, or Se, Z′ represents an atomic group necessary for forming a five-membered heterocycle; $R_1$, $R_2$, $R_3$ and $R_4$ independently represent a substituted or unsubstituted alkyl group, a substituted or unsubstituted aryl group, a substituted or unsubstituted aralkyl group, or hydrogen atom; $R_5$ represents a substituted or unsubstituted alkyl group, a substituted or unsubstituted aryl group, a substituted or unsubstituted aralkyl group, or an atomic group necessary for forming a six-membered heterocycle together with Z′; n represents 0, 1 or 2; X represents an anion and X may form an inner salt by bonding to $R_1$, $R_2$, $R_3$, $R_4$, $R_5$, $R_6$, Z′, $A_1$ or $A_2$.

3. The optical information recording medium of claim 2, wherein in the general formula (II), $A_1$ and $A_2$ are independently a hydrogen atom, chlorine atom, a substituted or unsubstituted alkyl group having 1 to 20 carbon atoms, a substituted or unsubstituted phenyl group having 6 to 20 carbon atoms, a substituted or unsubstituted benzyl group having 7 to 20 carbon atoms, a substituted or unsubstituted alkoxy group having 1 to 20 carbon atoms, a substituted or unsubstituted phenoxy group having 6 to 20 carbon atoms, or a substituted or unsubstituted benzyloxy group having 7 to 20 carbon atoms, each of said substituents being independently a halogen atom, cyano group, an alkoxy group, an aryloxy group, an ester group, a carbonamido group, a sulfonamido group, a carbamoyl group, a sulfamoyl group, an ureido group, a sulfonyl group, hydroxy group, a sulfo group or a carboxyl group; Y is O, S, Se, Te or $NR_6$ having 1 to 20 carbon atoms, where $R_6$ represents a substituted or unsubstituted alkyl group, a substituted or unsubstituted phenyl group, or a substituted or unsubstituted benzyl group, each of said substituents being independently the same as those described above as substituents of the groups represented by $A_1$ and $A_2$; Z′ is an atomic group necessary for forming a benzo or naphthoazole ring or —CH=CH—, where each of these groups may be substituted by a group described above as substituents of the groups represented by $A_1$ and $A_2$; $R_1$, $R_2$, $R_3$ and $R_4$ are independently a substituted or unsubstituted alkyl group having 1 to 20 carbon atoms, a substituted or unsubstituted phenyl group having 6 to 20 carbon atoms, a substituted or unsubstituted benzyl group having 7 to 20 carbon atoms, or hydrogen atom, each of said substituents being independently the same as those described above as substituents of the groups represented by $A_1$ and $A_2$; and $R_5$ is a substituted or unsubstituted alkyl group having 1 to 20 carbon atoms, a substituted or unsubstituted phenyl group having 6 to 20 carbon atoms, a substituted or unsubstituted aralkyl group having 7 to 20 carbon atoms, or an atomic group necessary for forming a condensed pyrimidine ring together with Z′, each of said substituents being the same as those described above as substituents of the groups represented by $A_1$ and $A_2$.

4. The optical information recording medium of claim 3, wherein in the general formula (II), $A_1$ and $A_2$ are independently a hydrogen atom, chlorine atom, an alkyl group having 1 to 6 carbon atoms, a phenyl group, a benzyl group, an alkoxy group having 1 to 6 carbon atoms, or a phenoxy group; Y is O, S, Se, Te or $NR_6$ where $R_6$ is an alkyl group having 1 to 6 carbon atoms, a phenyl group or a benzyl group; the atomic group represented by Z′ is —CH=CH— —CH=CH— substituted with a halogen atom, an alkyl group having 1 to 6 carbon atoms, a phenyl group, a substituted phenyl group having 6 to 12 carbon atoms, an alkoxy group having 1 to 6 carbon atoms, a substituted or unsubstituted phenoxy group having 6 to 20 carbon atoms, a carbonamido group having 1 to 20 carbon atoms, a sulfonamido group having 1 to 20 carbon atoms or an ureido group having 1 to 20 carbon atoms, or an atomic group capable of forming a condensed pyrimidine ring together with $R_5$; $R_1$ and $R_3$ are independently substituted or unsubstituted alkyl group having 1 to 12 carbon atoms, or a substituted or unsubstituted phenyl group having 6 to 12 carbon atoms; $R_2$ is a hydrogen atom, an alkyl group having 1 to 20 carbon atoms, or a substituted or unsubstituted phenyl group having 6 to 20 carbon atoms; $R_4$ is a phenyl group or a substituted phenyl group having 6 to 20 carbon atoms; and $R_5$ is an alkyl group having 1 to 20 carbon atoms, a sulfoalkyl group having 2 to 4 carbon atoms, a phenyl group, a sulfophenyl group, a benzyl group, a sulfobenzyl group, a phenethyl group, a sulfophenethyl group or an atomic group necessary for forming a condensed pyrimidine ring together with Z′.

5. The optical information recording medium of claim 2, wherein in the general formula (II), the anion represented by X is a halide ion, a sulfate ion, a monoalkylsulfate ion, a perchlorate ion, a sulfonate ion, a carbonate ion, a nitrate ion, an acetate ion, a benzoate ion, an oxalate ion, a phosphate ion, a tetraphenylborate ion or a tetrafluorophosphate ion.

6. The optical information recording medium of claim 5, wherein in the general formula (II), X is a bromide ion, an iodide ion, a sulfate ion, a monoalkylsulfate ion, a perchlorate ion, an alkylsulfonate ion or an arylsulfonate ion.

7. The optical information recording medium of claim 1, wherein the recording layer contains a binder in an amount of 0.01 to 2 times the weight of the compound of the general formula (I).

8. The optical information recording medium of claim 1, wherein the thickness of the recording layer is 0.01 to 2 μm.

9. The optical information recording medium of claim 8, wherein the thickness of the recording layer is 0.02 to 0.8 μm.

10. The optical information recording medium of claim 1, where a subbing layer is provided on the substrate.

11. The optical information recording medium of claim 1, wherein a protective layer is provided on the recording layer.

12. The optical information recording medium of claim 1, wherein a reflecting layer is provided on the recording layer.

13. An optical information recording medium being adapted to have information recorded thereon or read by a laser beam and having at least one compound as represented by the following general formula (I) and a quencher provided on a substrate:

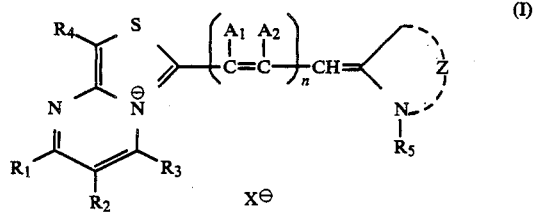

wherein:

$A_1$ and $A_2$ independently represent a hydrogen atom or a substituent;

Z represents an atomic group necessary for forming a five-membered heterocycle;

$R_1$ to $R_4$ independently represent a hydrogen atom or a substituent;

$R_5$ represents a substituent or may form a six-membered heterocycle with Z;

n represents 0, 1 or 2;

and $X\gamma$ represents an anion.

14. The optical information recording medium of claim 13, wherein an optical information recording medium provided with a recording layer on at least one side of a substrate, the recording layer contains at least one of the compounds represented by the following general formula (II) and a quencher:

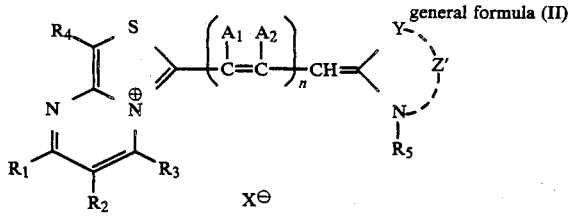

wherein $A_1$ and $A_2$ independently represent hydrogen atom, a halogen atom, substituted or unsubstituted alkoxy group, a substituted or unsubstituted aryloxy group, cyano group, a substituted or unsubstituted alkyl group, a substituted or unsubstituted aryl group, or a substituted or unsubstituted aralkyl group; Y represents $NR_6$, where $R_6$ represents a substituted or unsubstituted alkyl group, a substituted or unsubstituted aryl group, or a substituted or unsubstituted aralkyl group, O, S, or Se, Z' represents an atomic group necessary for forming a five-membered heterocycle; $R_1$, $R_2$, $R_3$ and $R_4$ independently represent a substituted or unsubstituted alkyl group, a substituted or unsubstituted aryl group, a substituted or unsubstituted aralkyl group, or hydrogen atom; $R_5$ represents a substituted or unsubstituted alkyl group, a substituted or unsubstituted aryl group, a substituted or unsubstituted aralkyl group, or an atomic group necessary for forming a six-membered heterocycle together with Z'; n represents 0, 1 or 2; X represents an anion; and X may form an inner salt by bonding to $R_1$, $R_2$, $R_3$, $R_4$, $R_5$, $R_6$, Z', $A_1$ or $A_2$.

15. The optical information recording medium of claim 14, wherein in the general formula (II), $A_1$ and $A_2$ are independently a hydrogen atom, chlorine atom, a substituted or unsubstituted alkyl group having 1 to 20 carbon atoms, a substituted or unsubstituted phenyl group having 6 to 20 carbon atoms, a substituted or unsubstituted benzyl group having 7 to 20 carbon atoms, a substituted or unsubstituted alkoxy group having 1 to 20 carbon atoms, a substituted or unsubstituted phenoxy group having 6 to 20 carbon atoms, or a substituted or unsubstituted benzyloxy group having 7 to 20 carbon atoms, each of said substituents being independently a halogen atom, cyano group, an alkoxy group, an aryloxy group, an ester group, a carbonamido group, a sulfonamido group, a carbamoyl group, a sulfamoyl group, an ureido group, a sulfonyl group, hydroxy group, a sulfo group or a carboxyl group; Y is O, S, Se, or $NR_6$ having 1 to 20 carbon atoms, where $R_6$ represents a substituted or unsubstituted alkyl group, a substituted or unsubstituted phenyl group, or a substituted or unsubstituted benzyl group, each of said substituents being independently the same as those described above as substituents of the groups represented by $A_1$ and $A_2$; Z' is an atomic group necessary for forming a benzo or naphthoazole ring or $+CH=CH+$, where each of these groups may be substituted by a group described above as substituents of the groups represented by $A_1$ and $A_2$; $R_1$, $R_2$, $R_3$ and $R_4$ are independently a substituted or unsubstituted alkyl group having 1 to 20 carbon atoms, a substituted or unsubstituted phenyl group having 6 to 20 carbon atoms, a substituted or unsubstituted benzyl group having 7 to 20 carbon atoms, or hydrogen atom, each of said substituents being independently the same as those described above as substituents of the groups represented by $A_1$ and $A_2$; and $R_5$ is a substituted or unsubstituted alkyl group having 1 to 20 carbon atoms, a substituted or unsubstituted phenyl group having 6 to 20 carbon atoms, a substituted or unsubstituted aralkyl group having 7 to 20 carbon atoms, or an atomic group necessary for forming a condensed pyrimidine ring together with Z', each of said substituents being the same as those described above as substituents of the groups represented by $A_1$ and $A_2$.

16. The optical information recording medium of claim 15, wherein in the general formula (II), $A_1$ and $A_2$ are independently a hydrogen atom, chlorine atom, an alkyl group having 1 to 6 carbon atoms, a phenyl group, a benzyl group, an alkoxy group having 1 to 6 carbon atoms, or a phenoxy group; Y is O, S, Se, or $NR_6$ is an alkyl group having 1 to 6 carbon atoms, a phenyl group or a benzyl group; the atomic group represented by Z' is $+CH=CH+$, $+CH=CH+$ substituted with a halogen atom, an alkyl group having 1 to 6 carbon atoms, a phenyl group, a substituted phenyl group having 6 to 12 carbon atoms, an alkoxy group having 1 to 6 carbon atoms, a substituted or unsubstituted phenoxy group having 6 to 20 carbon atoms, a carbonamido group having 1 to 20 carbon atoms, a sulfonamido group having 1 to 20 carbon atoms or an ureido group having 1 to 20 carbon atoms, or an atomic group capable of forming a condensed pyrimidine ring together with $R_5$; $R_1$ and $R_3$ are independently a substituted or unsubstituted alkyl group having 1 to 12 carbon atoms, or a substituted or unsubstituted phenyl group having 6 to 12 carbon atoms; $R_2$ is a hydrogen atom, an alkyl group having 1 to 20 carbon atoms, or a substituted or unsubstituted phenyl group having 6 to 20 carbon atoms; $R_4$ is a phenyl group or a substituted phenyl group having 6 to 20 carbon atoms; and $R_5$ is an alkyl group having 1 to 20 carbon atoms, a sulfoalkyl group having 2 to 4 carbon atoms, a phenyl group, a sulfophenyl group, a benzyl group, a sulfobenzyl group, a phenethyl group, a sulfophenethyl group or an atomic group necessary for forming a condensed pyrimidine ring together with Z'.

17. The optical information recording medium of claim 14, wherein in the general formula (II), the anion represented by X is a halide ion, a sulfate ion, a monoalkylsulfate ion, a perchlorate ion, a sulfonate ion, a carbonate ion, a nitrate ion, an acetate ion, a benzoate ion, an oxalate ion, a phosphate ion, a tetraphenylborate ion or a tetrafluorophosphate ion.

18. The optical information recording medium of claim 17, wherein in the general formula (II), X is a bromide ion, an iodide ion, a sulfate ion, a monoalkylsulfate ion, a perchlorate ion, an alkylsulfonate ion or an arylsulfonate ion.

19. The optical information recording medium of claim 13, wherein the quencher is a compound represented by the following general formula (III) or (IV):

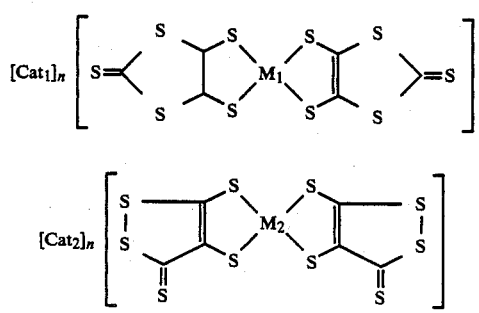

wherein, (Cat$_1$) and (Cat$_2$) represent a cation necessary for making the complex neutral, and are respectively selected from the group consisting of alkali metal ions, alkaline earth metal ions, NH$_4$+, quaternary ammonium ions and quaternary phosphonium ions; M$_1$ and M$_2$ independently represent nickel, copper, cobalt, palladium or platinum; and n represents 1 or 2.

20. The optical information recording medium of claim 19, wherein (Cat$_1$) and (Cat$_2$) are represented by the following general formula (V-a), (V-b), (V-c), (V-d) or (V-e):

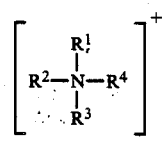  [V-a]

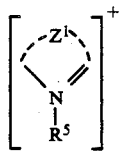  [V-b]

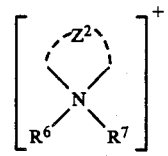  [V-c]

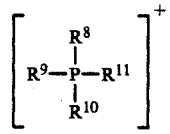  [V-d]

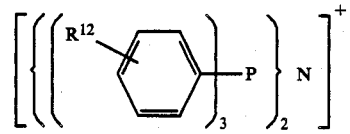  [V-e]

wherein $R^1$, $R^2$, $R^3$, $R^4$, $R^5$, $R^6$, $R^7$, $R^8$, $R^9$, $R^{10}$, $R^{11}$ and $R^{12}$ independently represent a substituted or unsubstituted alkyl group having 1 to 20 carbon atoms, or a substituted or unsubstituted aryl group having 6 to 14 carbon atoms, each of said substituents being independently a cyano group, an hydroxyl group, an alkyl group having 1 to 20 carbon atoms, an aryl group having 6 to 14 carbon atoms, an acyloxy group having 2 to 20 carbon atoms, an alkoxy group having 1 to 6 carbon atoms, an aryloxy group, an aralkyl group, an alkoxycarbonyl group, an aryloxycarbonyl group, an acyl group, an acylamino group, a carbamoyl group, an alkylsulfonylamino group, a sulfamoyl group, or a sulfonyl group; and $Z^1$ and $Z^2$ independently represent nonmetal atomic groups necessary for forming a five-membered ring or a six-membered ring together with nitrogen atom in the formulas.

21. The optical information recording medium of claim 20, wherein the five-membered ring or the six-membered ring is a pyridine ring, an imidazole ring, a pyrrole ring, a 2-pyrroline ring, a pyrrolidine ring, a piperidine ring, a pyrazole ring, a pyrazoline ring or an imidazoline ring.

22. The optical information recording medium of claim 21, wherein (Cat$_1$) and (Cat$_2$) are independently dodecylpyridinium groups, hexadecylpyridinium groups, dodecylimidazolium groups, N-ethyl-N-hexadecylpiperidinium groups, or N-ethyl-N-dodecylpyrazolidinium groups.

23. The optical information recording medium of claim 13, wherein the quencher is a bisdithio-α-diketone series compound represented by the following general formula:

wherein $R^1$ to $R^4$ independently represent an alkyl group or an aryl group, and M represents a divalent transition metal atom.

24. The optical information recording medium of claim 13, wherein the quencher is a bisphenyldithiol series compound represented by the following general formula:

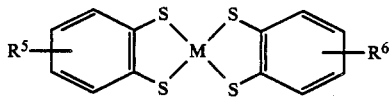

wherein $R^5$ and $R^6$ independently represent an alkyl group or a halogen atom, and M represents a divalent transition metal atom.

25. The optical information recording medium of claim 13, wherein the quencher is an acetylacetonate chelate series compound, a dithiocarbamic acid chelate series compound, a bisphenylthiol series compound, a thiocatechol chelate series compound, a salicylaldehyde oxime series compound, a thiobisphenolate chelate series compound, a phosphonous acid chelate series compound, a benzoate series compound, or a hindered amine series compound.

26. The optical information recording medium of claim 13, wherein the quencher is an aminium series or diimonium series compound represented by the following general formula:

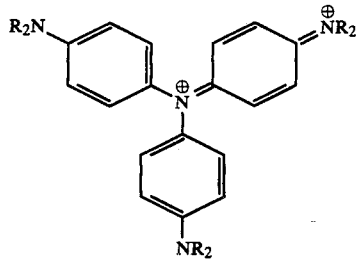

wherein R represents an alkyl group or an aryl group.

27. The optical information recording medium of claim 13, wherein the quencher is contained in an amount of 0.05 to 12 moles per 1 mole of the compound of the general formula (I).

28. The optical information recording medium of claim 27, wherein the quencher is contained in an amount of 0.1 to 1.2 moles per 1 mole of the compound of the general formula (I).

29. The optical information recording medium of claim 13, wherein the recording layer contains a binder in an amount of 0.01 to 2 times the weight of the compound of the general formula (I).

30. The optical information recording medium of claim 13, wherein the thickness of the recording layer is 0.01 to 2 μm.

31. The optical information recording medium of claim 30, wherein the thickness of the recording layer is 0.02 to 0.8 μm.

32. The optical information recording medium of claim 13, wherein a subbing layer is provided on the substrate.

33. The optical information recording medium of claim 13, wherein a protective layer is provided on the recording layer.

34. The optical information recording medium of claim 13, wherein a reflecting layer is provided on the recording layer.

* * * * *